US008769626B2

(12) United States Patent
Gundavelli et al.

(10) Patent No.: US 8,769,626 B2
(45) Date of Patent: Jul. 1, 2014

(54) WEB AUTHENTICATION SUPPORT FOR PROXY MOBILE IP

(75) Inventors: Srinath Gundavelli, San Jose, CA (US); Arun C. Alex, Nashua, NH (US); Rajesh P. Velandy, Nashua, NH (US); Rajesh S. Pazhyannur, Milpitas, CA (US); Mark Grayson, Berkshire (GB); Rajeev Koodli, Sunnyvale, CA (US); Gaetan Feige, l'Hay les Roses (FR); Steve W. Wood, Ontario (CA)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 13/305,844

(22) Filed: Nov. 29, 2011

(65) Prior Publication Data

US 2013/0139221 A1  May 30, 2013

(51) Int. Cl.
*H04L 29/06* (2006.01)
*H04W 12/06* (2009.01)
*H04W 28/02* (2009.01)

(52) U.S. Cl.
CPC .............. *H04W 12/06* (2013.01); *H04W 28/02* (2013.01)
USPC .......................................................... 726/4

(58) Field of Classification Search
CPC .............................. H04W 12/06; H04W 28/02
USPC ........................................................ 726/4–5
See application file for complete search history.

(56) References Cited

U.S. PATENT DOCUMENTS 7,626,963 B2    12/2009  Patel et al.
2007/0208864 A1*  9/2007  Flynn et al. .................... 709/227

OTHER PUBLICATIONS

Guinard, et al., "MobileIoT Framework: Connecting the EPC Network to MobilePhones," Proc. of MIRW, Mar. 23, 2009.
Gundavelli, et al., "Proxy Mobile IPv6," RFC 5213, Standards Track, IETF.org, Aug. 2008.

* cited by examiner

*Primary Examiner* — Hadi Armouche
*Assistant Examiner* — Dao Ho
(74) *Attorney, Agent, or Firm* — Edell, Shapiro & Finnan, LLC

(57) ABSTRACT

Techniques are provided for performing web authentication of mobile wireless devices that roam from a wireless wide area network to a wireless local area network. A redirect rule is invoked when a request is received from the mobile wireless device for world wide web access in order to obtain authentication for the mobile wireless device before permitting world wide web access. When a world wide web access request is received from the mobile wireless device, it is redirected to an authentication portal to allow a user of the mobile wireless device to enter user credentials to allow for world wide web access using the IP address.

11 Claims, 11 Drawing Sheets

WEB AUTHENTICATION SUPPORT FOR PROXY MOBILE IP

TECHNICAL FIELD

The present disclosure relates to authenticating mobile wireless devices.

BACKGROUND

Mobile wireless devices are capable of accessing world wide web data from a wide area wireless network, e.g., a 3G or 4G/LTE network, as well as wireless local area networks (WLANs), e.g., WiFi™ networks. Mobile wireless device users may roam from the wide area wireless network to a wireless local area network, and in the opposite direction as well.

Challenges are presented when a mobile wireless device roams from the wireless wide area network to a public wireless local area network, e.g., a so-called "hot spot". Many public wireless local area networks require some sort of authentication of the mobile wireless device and the user before permitting Internet access from the public wireless local area network. Current authentication procedures for this type of scenario have weak security and suffer from other shortcomings.

Most public WLAN deployments use web-based authentication for authorizing the mobile device user for network access when roaming from a wireless wide area network (e.g., cellular network) to a public WLAN. Web-based authentication involves a mobile device user being directed to a web page where the user enters credentials in order to be authorized for network access. Web-based authentication is considered a legacy mode, for its weak security properties, and there are efforts to replace it with IEEE 802.1x/Extensible Authentication Protocol (EAP)-based mechanisms. However, a very large percentage of the public WLAN deployments still use web-based authentication and network operators are reluctant to move away from it any time soon because of the lack of support for 802.1x/EAP support on the hundreds of millions of mobile handsets still in service, and due to the lack of client software in laptop computers running various operating systems versions. As a result, service providers are continuing to use web-based authentication support for authorizing network access.

At the same time, mobile wireless wide area network operators are now focusing on offloading users to WLAN access in order to reduce usage of the frequency band resources of the wireless wide area network. The wireless wide area network operators are building public WLANs (also known as "hotspots") and are attempting to integrate the public WLAN to the packet core infrastructure, called the Evolved Packet Core (EPC), in the wireless wide area network. In these integrated deployments, web-authentication is a mandatory. It is therefore necessary to support web-based authentication for Evolved Packet Core (EPC)—WLAN interworking.

DESCRIPTION OF EXAMPLE EMBODIMENTS

Overview

Techniques are provided for performing web authentication of mobile wireless devices that roam from a wireless wide area network to a wireless local area network. Data is stored for a redirect rule for traffic associated with a mobile wireless device that has associated with a wireless access point in a public wireless local area network and has been given a temporary unauthenticated session access using an Internet Protocol (IP) address assigned to the mobile wireless device by equipment in a wireless wide area core network that serves as a home network for the mobile wireless device. The redirect rule is for use when a request is received from the mobile wireless device for world wide web access in order to obtain authentication for the mobile wireless device before permitting world wide web access. When a world wide web access request is received from the mobile wireless device, it is redirected to an authentication portal to allow a user of the mobile wireless device to enter user credentials for world wide web access using the IP address.

Example Embodiments

Figure 1:
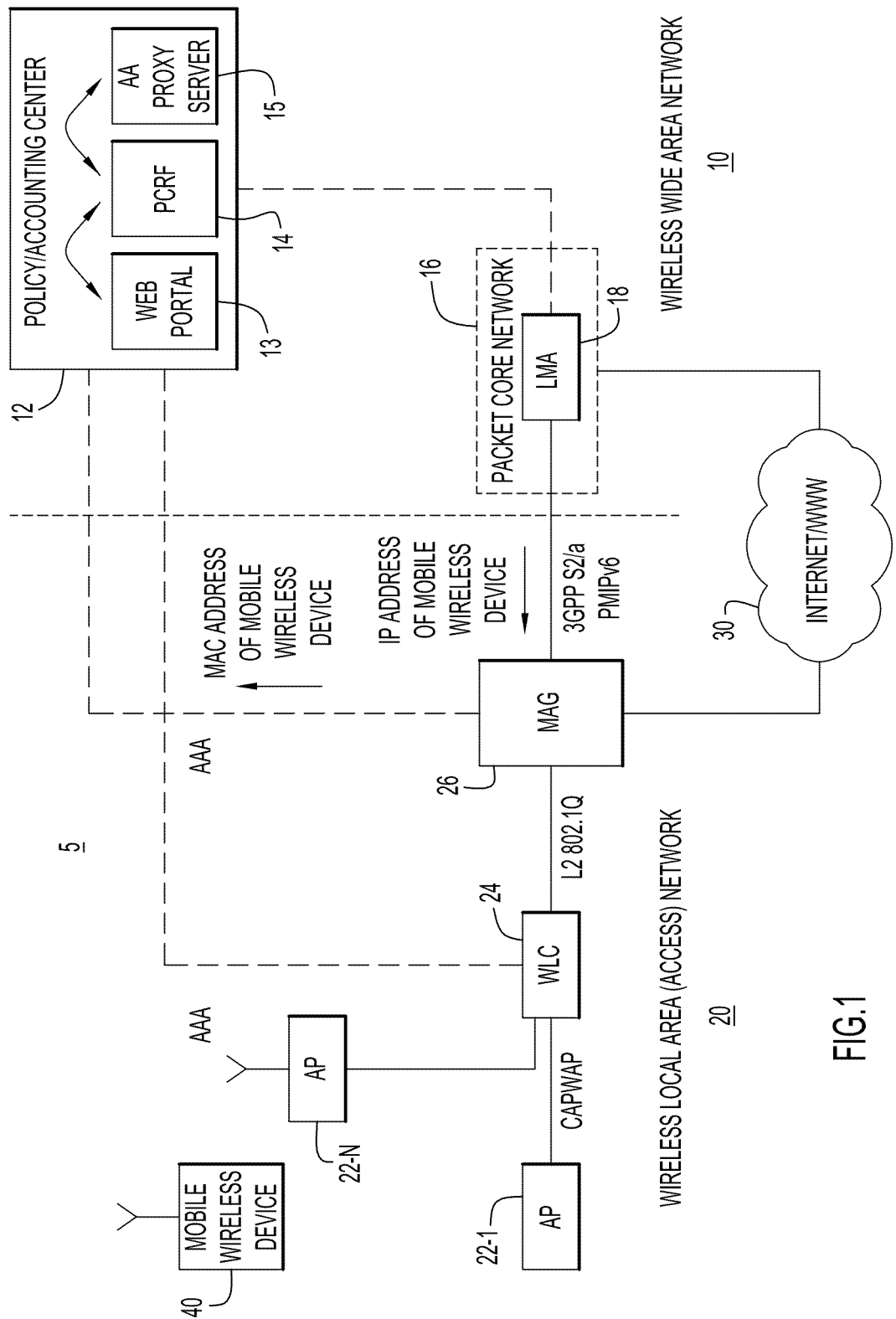
FIG. 1 is a block diagram showing integration of a wireless local area network and wireless wide area network for purposes of facilitating web authentication of a mobile wireless device.

Referring first to FIG. 1, a block diagram is shown of a network environment 5 comprising a wireless wide area network (WWAN) 10 and a wireless local area network (WLAN) 20, both of which have connectivity to the Internet/World Wide Web (WWW) shown at reference numeral 30. The WWAN 10 is, for example, a 3G or 4G/LTE wireless network, or any wireless wide area network using technology now known or hereinafter developed. A mobile wireless device 40 is shown in FIG. 1 and is an example of a device that has WWAN connectivity and WLAN connectivity capabilities, as is the case with most Smartphone™ devices currently available. The mobile wireless device 40 is also referred to herein as a "mobile node" or MN.

A user purchases a mobile wireless device and enters into a contract for service with a WWAN service provider. The user pays monthly access fees and other usage charges. To this end, the WWAN 10 includes a policy/accounting center 12 that includes a variety of functions that may be performed by one or more server computers. For example, there is a web portal server 13, a policy charging and rules function (PCRF) server 14, and an authentication, authorization and accounting (AAA) proxy server 15. The web portal server 13 serves an authentication web page to allow a mobile node user to enter user credentials in order to authenticate the mobile node for WWW access in the WLAN 20.

The techniques described herein are applicable and useful for a network that employs the Proxy Mobile IP version 6 (PMIPv6) protocol. However, this is only by way of example and not intended to be limiting. For example, another protocol interface is based on the General Packet Radio Service (GPRS) Tunneling Protocol (GTP).

In a portion of the WWAN 10 referred to as the "packet core network" 16, there is a local mobility anchor (LMA) 18. The mobile core network 16 may be an Evolved Packet Core network of a 3G network, for example. The LMA 18 is a router device, for example, that is configured to serve as the "home agent" for a mobile node in a Proxy Mobile IPv6 domain. It is the topological anchor point for the mobile node's home network prefix(es) and is the entity that manages the mobile node's binding state. The LMA 18 has the functional capabilities of a home agent as defined in Mobile IPv6 base specification (RFC3775) with the additional capabilities required for supporting Proxy Mobile IPv6 protocol, as defined in the specification of RFC 5213. There are multiple LMAs in the core network 16 of a WWAN 10, but for simplicity, only one LMA is shown in FIG. 1. Different mobile nodes may have different LMAs.

A Proxy Mobile IPv6 domain refers to the network where the mobility management of a mobile node is handled using the Proxy Mobile IPv6 protocol. The Proxy Mobile IPv6 domain includes LMAs and mobile access gateways between which security associations can be set up and authorization for sending Proxy Binding Updates on behalf of the mobile nodes can be ensured.

In the WLAN 20, there are one or more wireless access points (APs) shown at 22-1 through 22-N, each of which is connected to a WLAN controller (WLC) 24. There may be multiple WLCs in a WLAN, but only one is shown for simplicity. The techniques described herein are applicable when the WLAN 20 is realized using separate AP and WLC functionality. However, this is only by way of example and not intended to be limiting, and the techniques can be equally applied to so called autonomous WLAN deployments whereby the WLC function is collocated with the AP. The WLC 24 is connected to a mobile access gateway (MAG) 26. The MAG 26 is, for example, a router or switch device. The WLAN 20 may be a public WLAN, also known as a "hotspot" that is common in airports, coffee shops, shopping malls, etc.

The APs 22-1 and 22-N connect to the WLC 24 over a local area network, for example, and use the Control and Provisioning of Wireless Access Points (CAPWAP) protocol for communicating with the WLC 24. The WLC 24 communicates with the MAG 26 using, for example, the IEEE 802.1Q communication protocol/standard, which is the networking standard that supports Virtual LANs (VLANs) on an Ethernet network.

The MAG 26 communicates with the LMA 18 using any of a variety of protocols. For example, if the LMA 18 is part of a 3G network, it may use the 3GPP S2/a PMIPv6 protocol specified in the 3GPP Technical Specifications 23.402 and 29.275 when communicating with the MAG 26.

According to the techniques described herein, authentication of a mobile wireless device, e.g., mobile wireless device 40, is achieved with a more robust and flexible approach than those heretofore known, and one that results in enhanced IP address mobility for a subscriber session when the mobile wireless device hands-off from the WWAN 10 to the WLAN 20. More specifically, a mobile wireless device is assigned an IP address by equipment in the packet core network 16 of the WWAN 10. When the mobile wireless device roams to the WLAN 20, techniques are provided herein to obtain that same IP address that was assigned by the core network to allow for IP address mobility/continuity and communication session continuity. It is important or preferred to assign an IP address to the mobile wireless device from the packet core of the WWAN 10 rather than from the local WLAN because the IP address from the packet core of the WWAN 10 enables the mobile device user to access services in the mobile packet core network. For example, the mobile device user can access voice mail messages or billing applications without entering any user credentials. The packet core network can enable access to services based simply on identity of the IP address. Also, IP mobility is achieved by ensuring that the mobile wireless device obtains the same IP address when attached to the WWAN or WLAN.

Figure 2:
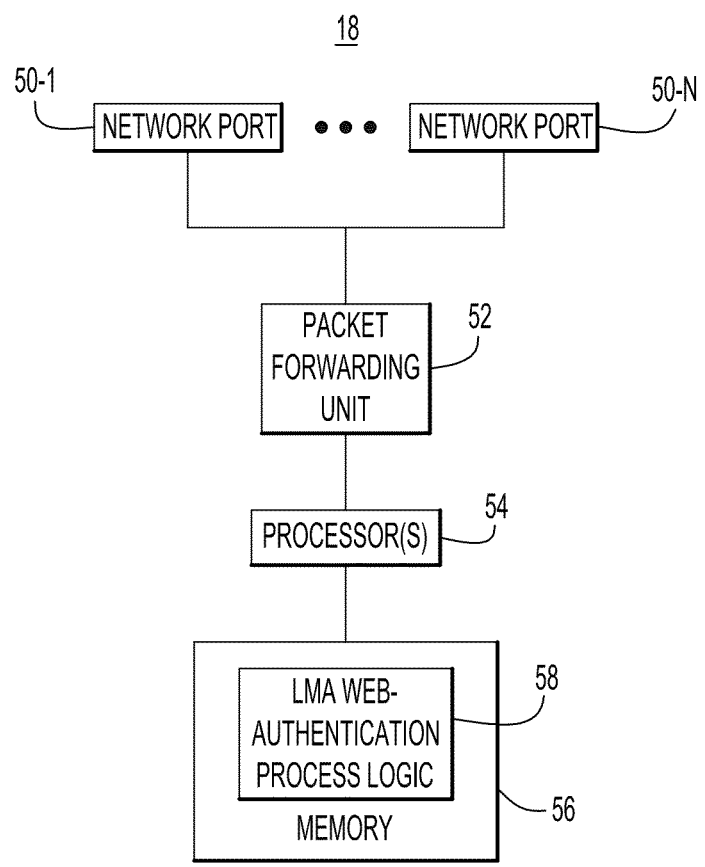
FIG. 2 is a block diagram of an example local mobility anchor in the wireless wide area core network and configured to perform the web authentication techniques described herein.

Reference is now made to FIG. 2 for an example of a block diagram of the LMA 18. The LMA 18 may be a network device, such as a router or switch, that has packet forwarding capabilities as well as computing/data processing capabilities. To this end, the LMA 18 comprises a plurality of network ports 50-1 through 50-N, a packet forwarding unit 52, a processor 54 (or multiple processors) and memory 56. The memory stores instructions for LMA web-authentication process logic 58.

Figure 3:
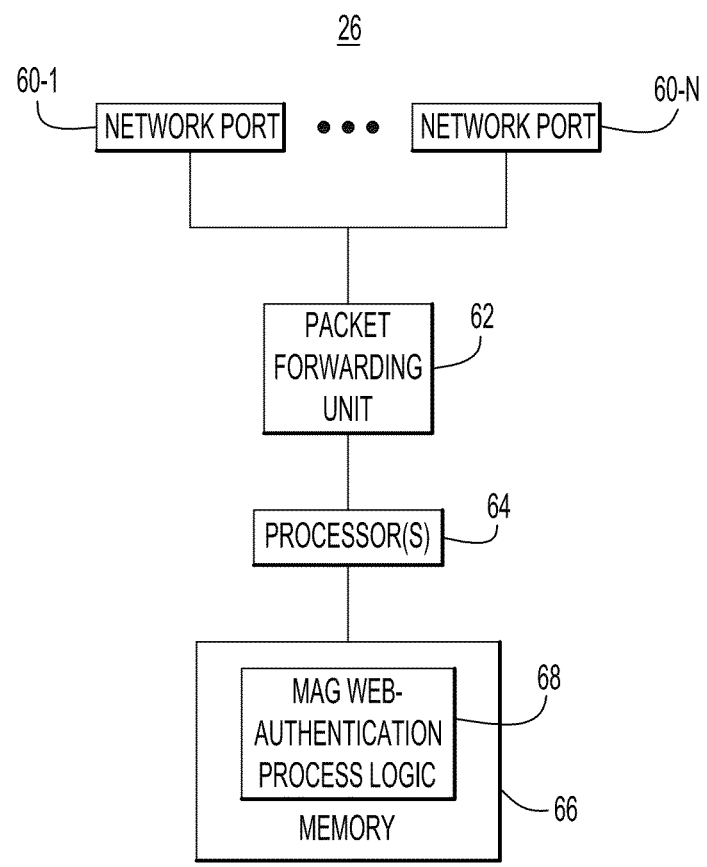
FIG. 3 is a block diagram of an example mobile access gateway in the wireless local area network and configured to perform the web authentication techniques described herein.

Similarly, FIG. 3 shows an example of a block diagram of the MAG 26. The MAG 26 may be a network device, such as a router or switch, that has packet forwarding capabilities as well as computing/data processing capabilities. The MAG 26 comprises a plurality of network ports 60-1 through 60-N, a packet forwarding unit 62, a processor 64 (or multiple processors) and memory 66. The memory stores instructions for MAG web-authentication process logic 68.

The memories 56 and 66 shown in FIGS. 2 and 3 (and in FIGS. 4 and 5 as well) may comprise read only memory (ROM), random access memory (RAM), magnetic disk storage media devices, optical storage media devices, flash memory devices, electrical, optical, or other physical/tangible (non-transitory) memory storage devices. The processors 54 and 64 are, for example, microprocessors or microcontrollers that executes instructions stored in their respective memories. Thus, in general, the memories 56 and 66 may comprise one or more tangible computer readable storage media (e.g., a memory device) encoded with software comprising computer executable instructions and when the software is executed (by the processors 54 and 66, respectively) it is operable to perform the operations described herein.

Figure 4:
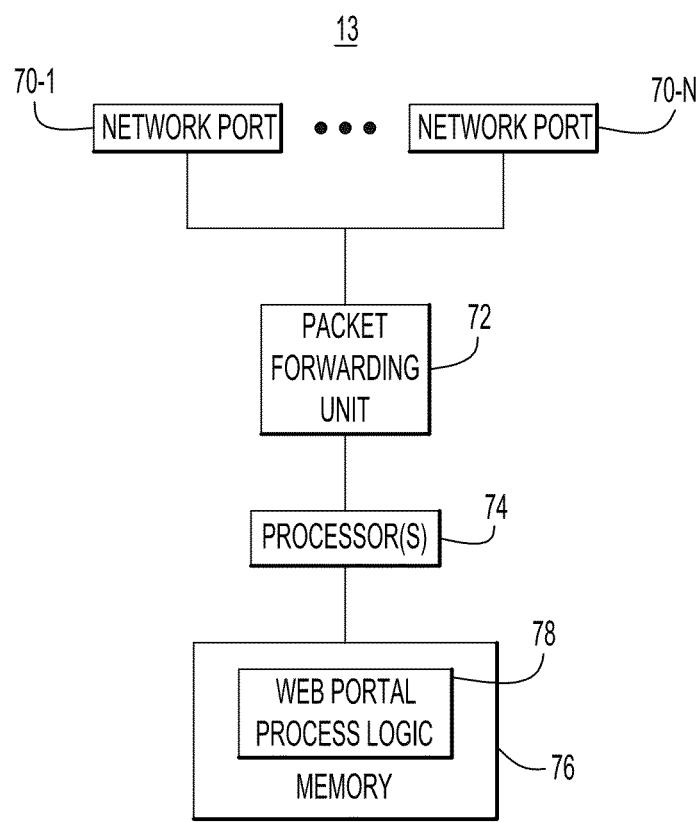
FIG. 4 is a block diagram of a web portal configured to perform the web authentication techniques described herein.

FIG. 4 illustrates an example block diagram of the web portal 13. The web portal 13 is a network switch or router device with web portal/packet routing capabilities and computing capabilities. To this end, the web portal 13 comprises a plurality of network ports 70-1 through 70-N, a packet forwarding unit 72, a processor (or multiple processors) 74, and memory 76. The memory 76 stores instructions for web portal process logic 78. As described hereinafter, the web portal process logic 78 enables the web portal 13 to present an authentication page to a mobile node user to enable the mobile node user to enter user credentials. The web portal process logic 78 also enables the web portal to signal the AAA proxy server 15 that an IP address associated with a "well known" shared identity has since been authenticated, together with an authenticated identity to be used by the MAG 26 in the WLAN 20. The web portal 13 is also referred herein to as an authentication portal.

Figure 5:
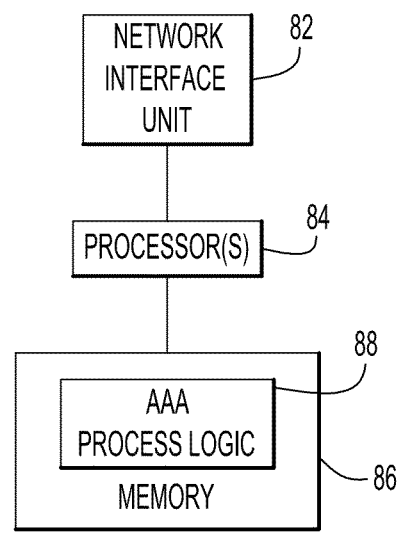
FIG. 5 is a block diagram of an accounting, authentication and authorization server configured to perform the web authentication techniques described herein.

FIG. 5 illustrates an example block diagram of the AAA proxy server 15. The AAA proxy server 15 is a computing device, e.g., a server, that comprises a network interface unit 82, a processor (or multiple processors) 84 and memory 86. The memory 86 stores instructions for AAA process logic 88. As described hereinafter, the AAA proxy logic 88 enables the AAA proxy server 15 to identify an indication that a mobile wireless device has not yet been authenticated, for example by recognizing the use of a pre-configured shared identity, and possibly to signal the LMA 18 to install a redirect rule in which the mobile wireless device is allowed access to the network but only in order to complete web-based authentication, for the mobile wireless device. The redirect rule and related concepts are described in further detail hereinafter. In addition, as described hereinafter, the AAA process logic 88 enables the AAA proxy serer 15 to signal the mobile access gateway with an authenticated identity associated with an IP address of a mobile node to be subsequently used in communications by the mobile access gateway in policy and charging messages as well as signaling that possibly previously installed redirect rules should be disabled (when the mobile node has been successfully web-authenticated). The terms "web-authenticated," "web authentication" and "Web-Auth" are used herein to refer to authentication using web-based authentication techniques as opposed to IEEE 802.1x/EAP techniques.

As described further hereinafter, the concept of a "shared identity" is exploited according to the web authentication techniques. A shared identity is a particular sequence of bits or digits that is contained in messages passed between the MAG 26 and LMA 18, between the LMA 18 and the web portal 13, and between the web portal 13 and AAA proxy server 15 as well as the PCRF server 14. All of these entities are configured to recognize this particular sequence of bits or digits as a shared identity used for temporary unauthenticated sessions for mobile nodes until the mobile node is web-authenticated. In one example, the particular sequence of bits or digits corresponds to an otherwise invalid identity or profile, but which is used for purposes of a common shared identity for temporary unauthenticated sessions. Again, the web portal 13, PCRF server 14, AAA proxy server 15, LMA 18 and MAG 26 all are configured, a priori, to recognize the particular sequence of bits or digits as a shared identity. The shared identity may also be used to signal to the LMA 18 or MAG 26 that a redirect rule should be installed and applied when web access traffic for the mobile node occurs prior to web-authentication of the mobile node. The redirection rule will cause the web access request from the mobile node to be redirected to the web portal 13 for web-authentication before allowing for full WWW access for the mobile node. As explained below, the MAC address of the mobile node is sent and the LMA is configured to support open-authentication. In this situation, there is no use of the shared identity as described above, though session create requests are accepted as they would for any unknown-user, but with enforeced redirect rules, so that the mobile node user can complete Web-Auth. In other cases, the mobile device may be authenticated using its IEEE 802.11 (WiFi) MAC address. The common signaling between the MAG 26 and LMA 18 is configured to include the mobile device's IEEE 802.11 MAC address, for example, using the Lower Layer Identifier as specified in RFC 5213. The MAC address will be signaled between the LMA 18, and to the PCRF server 14 and the AAA proxy server 15 which can then associate the MAC address with a subscription and signal an authentic identity back to the LMA 18.

According to the techniques described herein, the assigned IP address for a mobile node is an IPv4 address or IPv6 prefix that is assigned by equipment in the mobile node's home network in the packet core network of the WWAN 10. As used herein, mobile IP and mobile IP support refer to IP address mobility support provided for a mobile node. Simple IP support refers to the situation where there is no IP address mobility support for the mobile node, i.e., the approach of assigning an IP address to the mobile node from the local network.

Figure 6A:
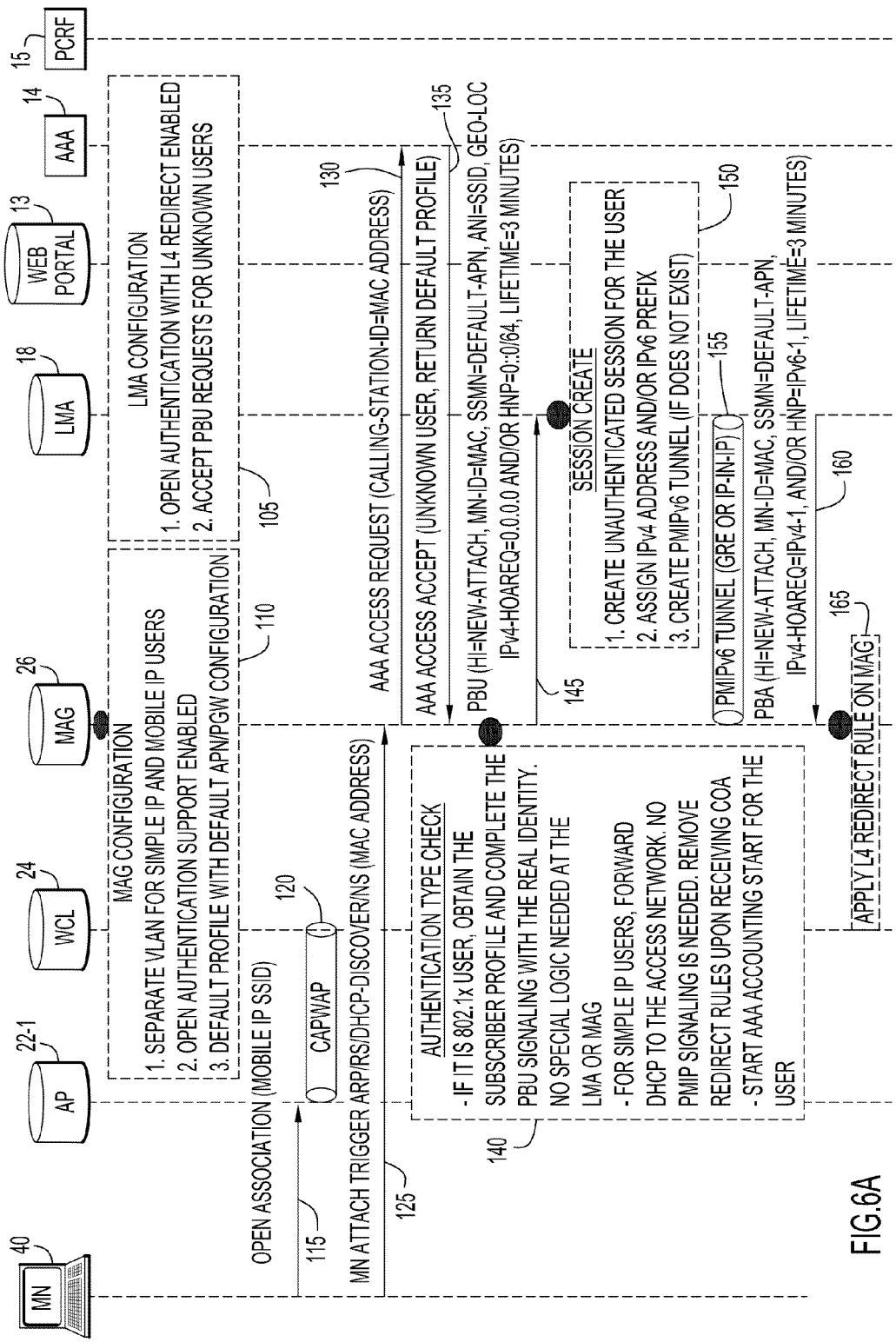
FIGS. 6A-6C illustrate a ladder diagram for a signal flow in which redirection of web access request from the mobile node to a web portal is based at the mobile access gateway.
Figure 6B:
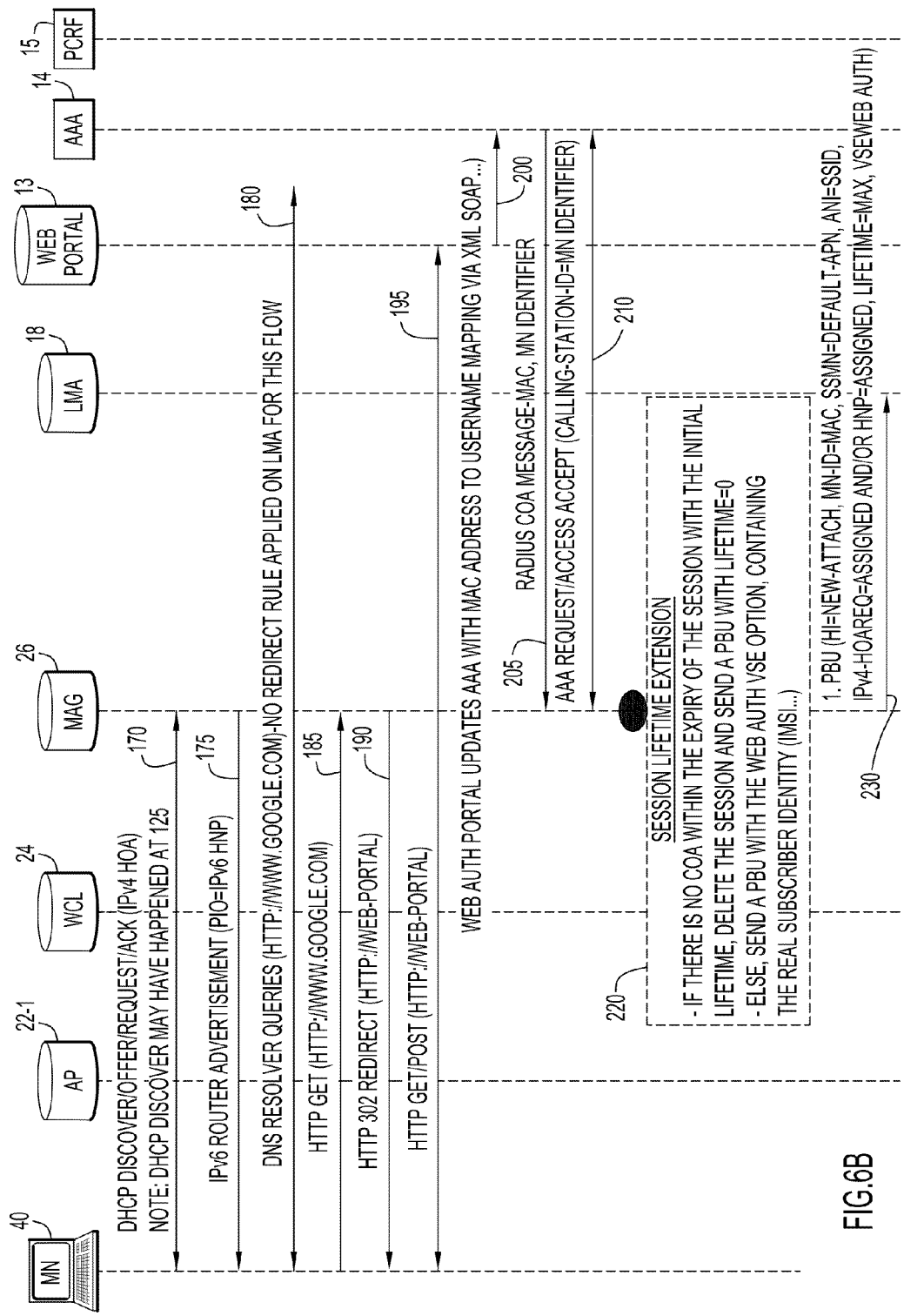
Figure 6C:
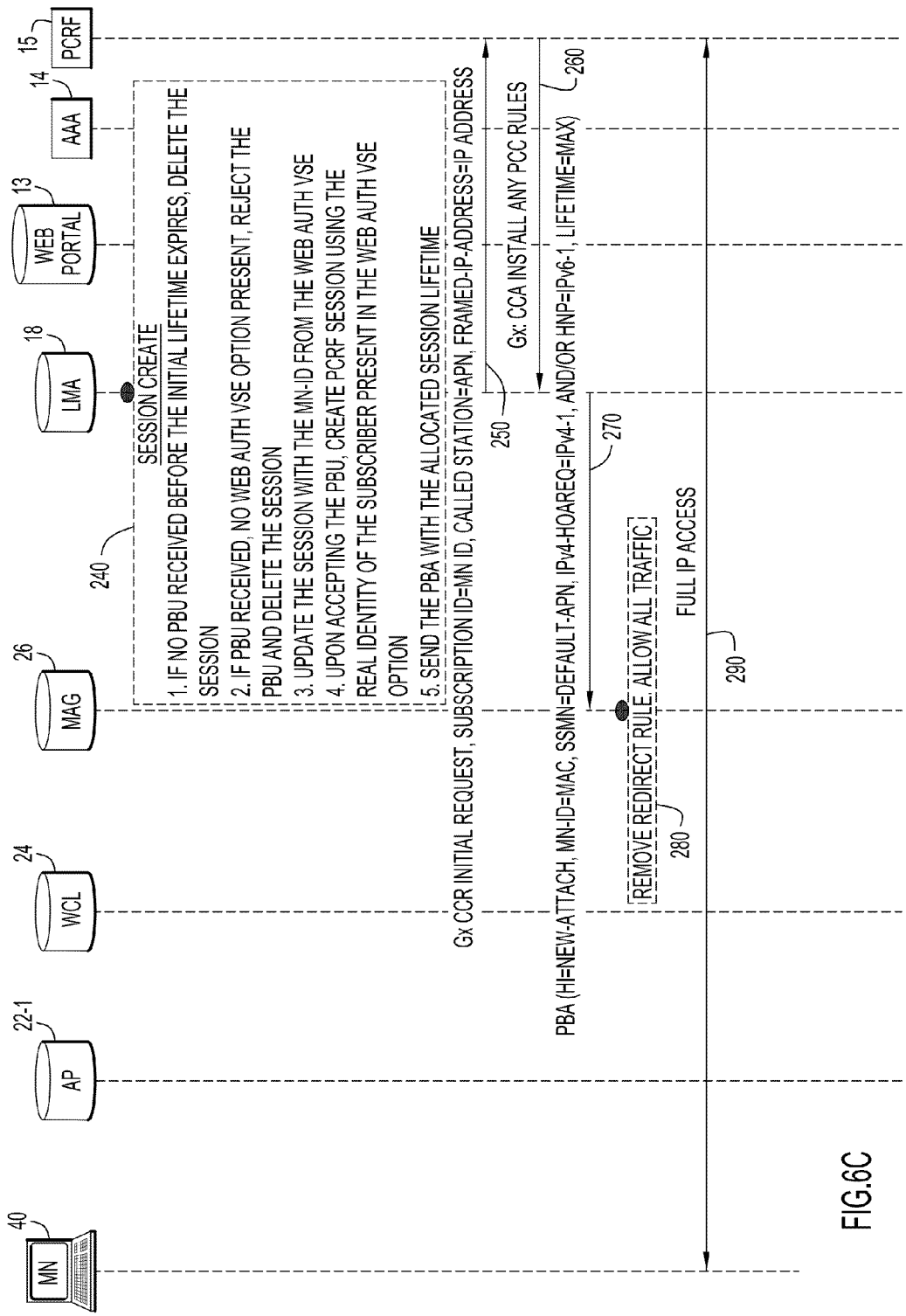
Figure 7A:
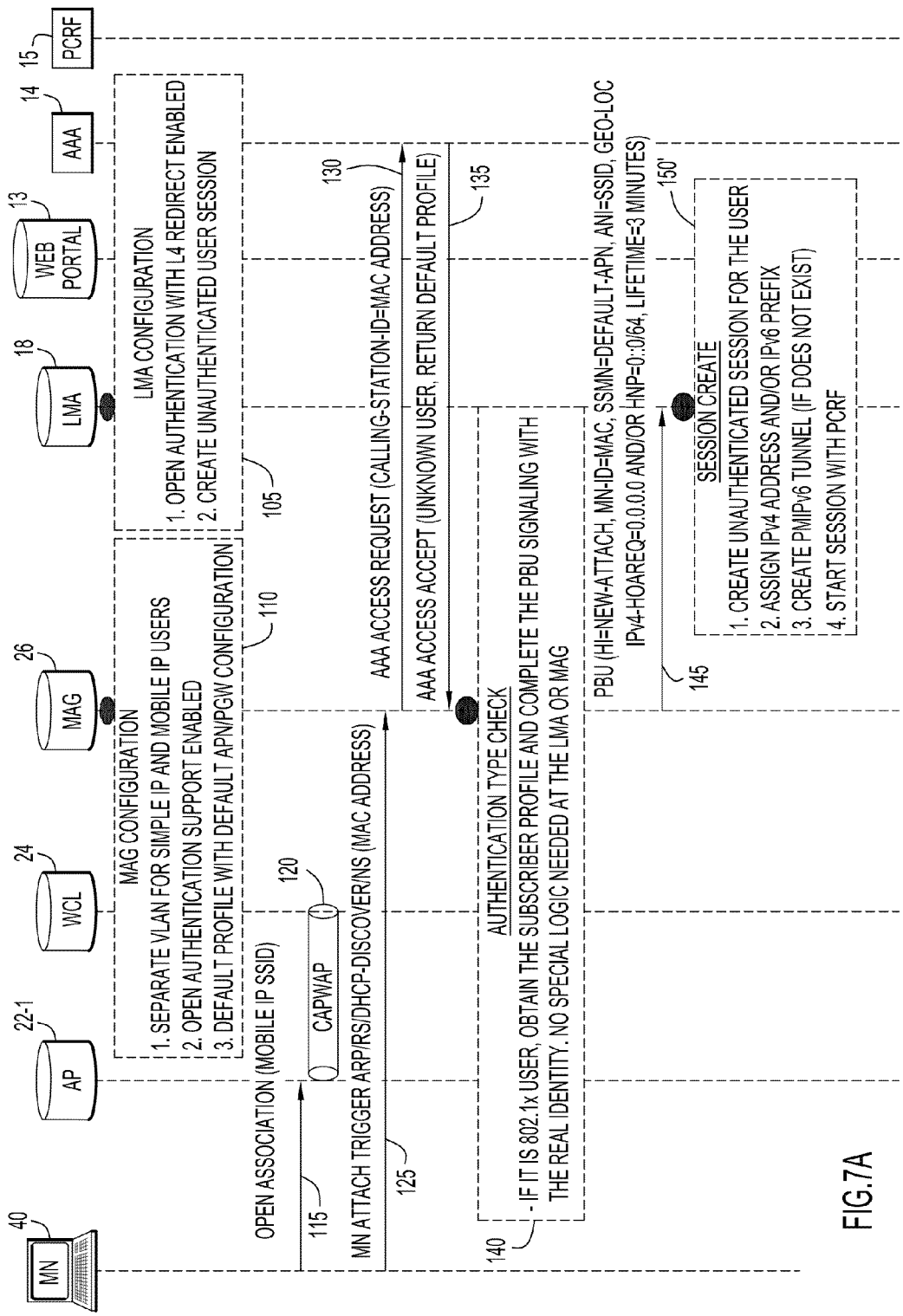
FIGS. 7A-7C illustrate a ladder diagram for a signal flow in which redirection of web access request from the mobile node to a web portal is based at the local mobility anchor.
Figure 7B:
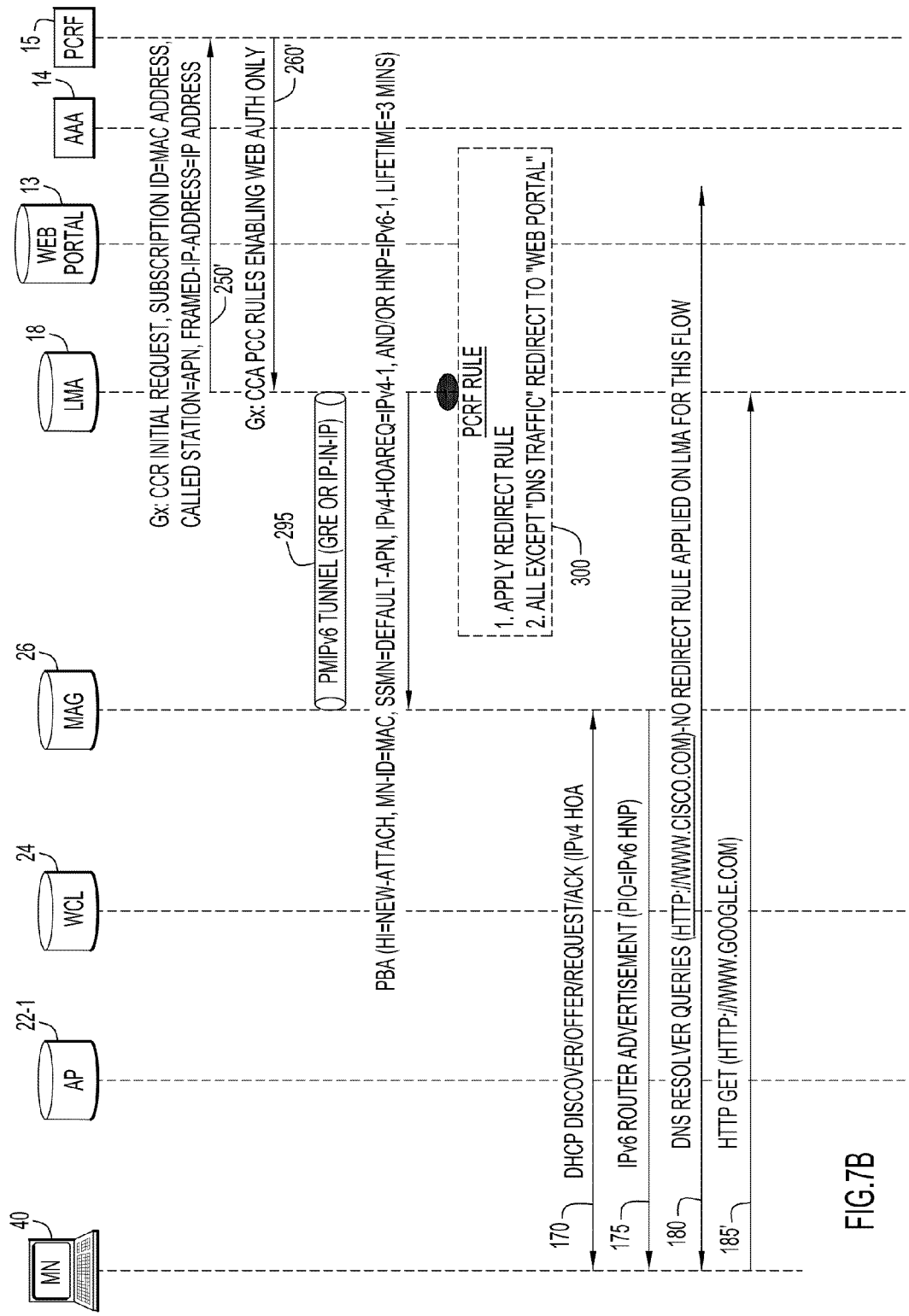
Figure 7C:
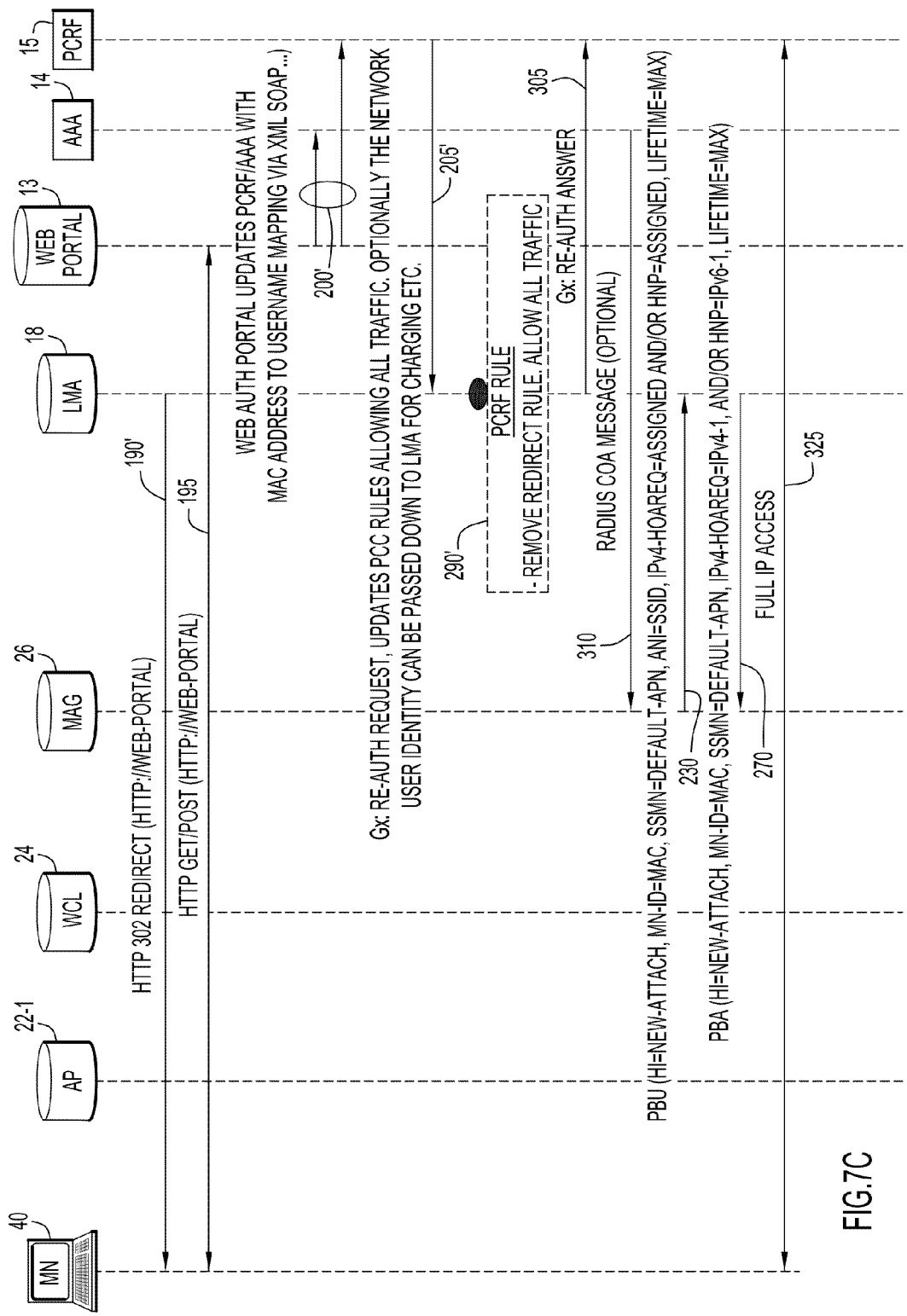

FIGS. 6A-6C illustrate a signal flow when the redirection operation is performed at the MAG 26. FIGS. 7A-7C illustrate a signal flow when the redirection operation is performed at the LMA 18. The LMA 18 executes the LMA web-authentication process logic 58 in performing its operations as part of the signaling flow of FIGS. 6A-6C and FIGS. 7A-7C. The MAG 26 executes the MAG web-authentication process logic 68 in performing its operations as part of the signal flows of FIGS. 6A-6C and FIGS. 7A-7C Likewise, the web portal 13 executes the web portal process logic 78 in performing its operations as part of the signal flows of FIGS. 6A-6C and FIGS. 7A-7C, and the AAA proxy server executes the AAA process logic 88 in performing its operations as part of the signal flows of FIGS. 6A-6C and FIGS. 7A-7C.

As a preliminary matter, an explanation is provided of the use of service set identifiers (SSIDs) for purposes of distinguishing between Simple IP and Mobile IP users, and also to identify the service provider WWAN for a mobile node. There is a separate SSID for Simple IP and Mobile IP mobile nodes (users). The table below gives an example.

| SSID   | VLAN   | Service   | Authentication Modes      |
|--------|--------|-----------|---------------------------|
| SSID-X | VLAN-X | Simple IP | EAP and web authentication |
| SSID-Y | VLAN-Y | Mobile IP | EAP and web authentication |

Traffic for these SSIDs may be kept separate in different VLANs. The MAG 26 is able to distinguish/identify the "type" of attached mobile devices based on the VLAN for that mobile device or via an AAA exchange. The web authentication techniques described herein and Extensible Authentication Protocol (EAP)-based authentication are supported on the same VLAN. Furthermore, as explained hereinafter, identification of the WWAN service provider home network (e.g., Sprint®, AT&T®, Verizon®, etc.) by the WLAN is achieved based on the SSID of a mobile node, or based on other technologies, such as HotSpot 2.0.

Reference is made back to FIG. 1. Web authentication is an authentication procedure whereby a user of a mobile wireless device is directed to a web page to allow the user to enter his/her user credentials (user name and password) for Internet/WWW access via a WLAN, e.g., a public WLAN. The user credentials entered by a mobile wireless device user are supplied to an authentication portal prior to enabling Internet/WWW access for the mobile device.

When a mobile wireless device is to be subjected to the web authentication procedure, an IP address for an unauthenticated user needs to be assigned to the mobile wireless device by the core network of the WWAN. The MAG 26 establishes a PMIPv6 session with the LMA 18 to obtain an IP address so that the MAG 26 can complete its authentication and present its "real identity" to the WLAN. "Real identity" implies the identity that is known to the network elements, for example, Subscriber Identity Module (SIM) Identity. Prior to authentication of the mobile wireless device, the only identity that is available for the mobile wireless device is its media access control (MAC) address. The MAC address of each mobile wireless device may, however, not be provisioned a priori at the policy/accounting center 12, but it is provisioned in advance for MAC-based authentication. Consequently, a unique technique is employed to enable web-authentication without direct access to the real identity of the mobile wireless device user.

Referring now to FIGS. 6A-6C, the operational flow when the MAG 26 performs the redirection is now described. Initially, the MAG 26 and the LMA 18 are configured to support the web authentication techniques described herein. At 105, the LMA 18 is configured to support open authentication with Layer 4 redirection rules enabled. The LMA 18 is enabled to create an unauthenticated session for any mobile node based on a mobile node identifier and an Access Point Name (APN) provisioned by the WWAN 10. Normally, this mode of operation is supported for emergency services on all mobile gateways.

The identity that is presented in a proxy binding update (PBU) message may be the MAC address of the mobile node or a pre-configured shared identity as described above. This identifier is carried or contained in the MN-Id option of the PBU message, and the LMA 18 is enabled to create an unauthenticated session based on this identifier. According to the PMIPv6 standard, a PBU message is a request message sent by a mobile access gateway to a mobile node's LMA, e.g., LMA 18, for establishing a binding between the mobile node's home network prefix(es) assigned to a given interface of a mobile node and its current care-of address (Proxy-CoA).

Similarly, the MAG 26, at 110, is configured to support open authentication, and to request a PMIPv6 session on the LMA 18 for an unauthenticated user, only known by the MAC address for the mobile node. The MAG 26 is configured to have separate VLANs for Simple IP and Mobile IP users, as described above. The MAC addresses of mobile nodes are not provisioned, a priori, in profiles for the mobile nodes at the MAG 26. Instead, the MAG 26 is pre-configured, or obtains from the policy/accounting center 12, a default profile. This default profile includes an indication as to whether the aforementioned shared identity should be used in communication with the LMA 15. For example, the Access Accept message (from the AAA proxy server 15) may indicate to the MAG 26 a shared identity allocated for unauthenticated mobile nodes in order to establish a temporary unauthenticated session for a mobile node. Alternatively, the Access Accept message may indicate the identity to be used should be based on the IEEE 802.11 MAC address. The MAG 26 will also use the signaled identity of the mobile node in the MN-Id option in a PBU message to the LMA 18.

There is an optional interface assumed between the web portal 13 and the MAG 26 to obtain the authentication complete event and user identity. This interface is used when the subscriber services are needed in the WLAN 20, or for supporting the mobile access gateway-based Layer 4 redirection techniques described herein.

The actual signal flow for the mobile access gateway-based Layer-4 redirection of FIGS. 6A-6C begins when a mobile node 40 associates with a WLAN AP, e.g., AP 22-1, at 115. This is referred to as an "open association" and the mobile node will send a Mobile IP SSID that will reveal the service provider network (e.g., Sprint®, AT&T®, Verizon®, etc.) to which the mobile node is subscribed and a part of. Then, the AP 22-1 and the WLC 24 will establish a communication session over a CAPWAP tunnel 120. Next, at 125, the mobile node sends an Attach Trigger message that contains the MAC address of the mobile node. The MAC address of the mobile node is unique to the mobile node device. The Attach Trigger message indicates that the mobile node has associated with an AP in the WLAN 20, and this message may be based on the Address Resolution Protocol (ARP), Router Solicitation messages, or Dynamic Host Configuration Protocol (DHCP) protocol messages. The Attach Trigger message (which includes the MAC address of the mobile node) is directed by the WLC 24 to the MAG 26.

In response to receiving the Attach Trigger message from the mobile node, the MAG 26 will seek authorization of the mobile node in order to determine whether and what type of session to establish for the mobile node. At 130, the MAG 26 sends an Access Request message to the AAA proxy server 15 via the LMA 18. The AAA proxy server 15 will look up in its database to determine whether it has an authenticated identity for the MAC address, and assuming that the mobile node is not already web-authenticated, the AAA server, at 135, will send an Access Accept message with values in its fields indicating that the mobile node user is unknown with a default profile that includes the shared identity bit or digit sequence described above. The LMA and mobile access gateway are configured/programmed to recognize the default profile bit sequence as being a shared identity for use in setting up a temporary unauthenticated session (during which the mobile node cannot perform any service access, e.g., WWW access until and if the mobile node is fully authenticated) and during the temporary unauthenticated session, traffic for the mobile node will go the WWAN core network and get redirected to the web portal 13, as described hereinafter.

As an alternative, the Access Request message is sent to the PCRF server 14 instead of the AAA proxy server 15, and the PCRF server 140 sends the Access Accept message indicating that the mobile node is unknown and to use a default profile for the mobile node, where the default profile includes the shared identity for the temporary unauthenticated session for the mobile node.

At 140, the MAG 26 will perform an authentication type check. If the mobile node is an IEEE 802.1x user, then the MAG 26 can obtain the subscriber profile including the real user identity for it (from the AAA proxy serer), and complete the PBU signaling with the real identity. If the mobile node is a Simple IP user, it will forward DHCP request to the WLAN. No PMIP signaling is needed for a Simple IP user and any redirect rules for the mobile node can be removed upon receiving the Change of Authentication (CoA) from the AAA server.

The SSID in the Attach Trigger message sent to the MAG 26 at 125 will indicate to the WLAN infrastructure, e.g., the MAG 26, which LMA in the WWAN 20 is the home network for the mobile node, and thus the MAG 26 knows which LMA to communicate with for supporting service to the mobile node. As explained above, there is a one-to-one mapping between an SSID and a home service provider network. For example, XYZ-SSID means that the SSID is associated the WWAN service provider "XYZ". When the mobile node is determined to be seeking web authentication, then at 145, the MAG 26 will send a PBU message to the proper LMA, e.g., LMA 18, to initiate a PMIPv6 session with the LMA 18 on behalf of the mobile node. The PBU message contains several fields: HI, MN_Id, SSMN, ANI, Geo-Loc IPv4-HoAReq, HNP and lifetime, where HI stands for Handover Hint (HI), SSMN stands for Service Selection Mobility (SSM) option, ANI stands for Access Network Information (ANI) option, HoA stands for Home Address, HNP stands for Home Network Prefix. The values in the PBU message sent by the MAG 26 at 145 area: HI=New-Attach, MN-Id=MAC Address, SSMN=Default-APN, ANI=SSID, Geo-Loc IPv4-HoAReq=0.0.0.0 and HNP=0::0/64, and lifetime=some period of time, e.g., 3 minutes.

One purpose of the MAG 26 sending the PBU message to the LMA 18 is to obtain the IP address for the mobile node. Again, the LMA 18 is representative of equipment in the WWAN core network that serves as the home network for the mobile node.

In response to receiving the PBU message, at 150, the LMA 18, creates a temporary unauthenticated session for the mobile node, assigns an IPv6 address and/or IPv6 prefix, and creates a PMIPv6 tunnel to the MAG 26 (if one does not already exist). Recall that the MAG 26 will direct the PBU message to the particular LMA of the service provider network to which the mobile node is determined to belong (from the SSID obtained from the mobile node at operation 115.) Thus, the particular LMA to which the PBU message is sent at 145 will be the LMA in the WWAN core network that serves that as the home network for the mobile node. Thus, the LMA assigning the IP address to the mobile node is the anchor router device for the mobile node. The PMIPv6 tunnel is graphically depicted in FIG. 6A at reference numeral 155.

At 160, the LMA 18 sends a proxy binding acknowledgment (PBA) message to the MAG 26. The PBA message has similar fields as the PBU message, and in this case, the IP4HoAReq will be the IPv4 prefix and/or the HNP will be the IPv6 prefix assigned by the LMA 18 at 110.

As an alternative to using PMIPv6, the LMA 18 may use the General Packet Radio Service (GPRS) Tunneling Protocol (GTP) with the MAG 26 to deliver the IP address for the mobile wireless device. In response to receiving the IP address from the LMA 18, at 165 the MAG 26 stores data to create a Layer-4 redirect rule to be applied for the mobile node during the temporary unauthenticated session for the mobile node. Generally, the redirect rule is applied to traffic associated with a mobile node that has associated with an AP in a public WLAN and has been given a temporary unauthenticated session access using an IP address assigned to the mobile node by equipment in the wireless wide area core network (e.g., the LMA 18) that serves as a home network for the mobile node. Again, the redirect rule is for use when a request is received from the mobile wireless device for WWW access in order to obtain authentication for the mobile wireless device before permitting WWW access.

As a result of the operations at 150-160, the mobile node gets the same IP address that it had in the WWAN. This allows for mobility of the IP address and session continuity when the mobile node hands off from the WWAN 10 to the WLAN 20.

At 170, a series of operations are performed for DHCP Discover/Offer/Request/Ack between the MAG 26 and the mobile node. At 175, the MAG 26 sends an IPv6 Router Advertisement message (with the Prefix Information Option set to the IPv6 HNP referred to above).

Reference numeral 180 shows that all Domain Name Service (DNS) Resolver Queries initiated by the mobile node are handled without application of the redirect rule.

At 185, however, the mobile node makes a Hypertext Transport Protocol (HTTP) Get request for a particular web site, and this request is forwarded to the MAG 26. The MAG 26 receives the WWW access request (e.g., the HTTP Get request) and determines that the request is from the mobile node that is subject to a temporary unauthenticated session and for which all WWW requests are to be redirected to the web portal 13. Thus, at 190, the MAG 26 sends to the mobile node a redirect message, e.g., an HTTP 203 REDIRECT message containing the Universal Resource Locator (URL) for the web portal 13, (e.g., http://web-portal). In so doing, the MAG 26 redirects the WWW access request from the mobile node to an authentication portal to allow a user of the mobile wireless device to enter user credentials for WWW access using the IP address.

As a result of the establishment of the temporary unauthenticated session and the redirect rule, the mobile node cannot perform any service access (e.g., WWW access) until the web authorization is complete. The traffic for the mobile node will go to the LMA 18 in the WWAN core network and get directed to the web portal.

At 195, based on the redirect message, the mobile node sends a request, e.g., an HTTP GET/POST request to the web portal 13. The web portal 13 receives the request from the mobile node and presents the mobile node user with a web page to allow the mobile node user to enter user credentials, e.g., user name and password, and any other necessary credentials. If the web portal finds that the user credentials entered by the user are valid, at 200, it sends a message to the AAA proxy server 15 to update the AAA proxy server 15 with the MAC address to user name mapping for the mobile node. For example, the message sent at 200 may be sent in according with the Simple Object Access Protocol (SOAP). To this end, the web portal 13 supplies the IP Address which is present in the HTTP request to identify the mobile node to the AAA proxy server 15 so that it knows that the user name supplied by the web portal is the user name associated with the user of the mobile node whose MAC address was previously supplied to the AAA proxy server by the MAG 26. The entity that is performing the redirect of the HTTP messages from the mobile node (MAG or LMA) embeds metadata to the HTTP request that contains additional identifiers of the mobile node, such as the MAC address. As a result, the authentication portal has the metadata of the HTTP request and the user login information. If the user is successfully authenticated, the authentication portal sends the event {User-Name/SIM, IP Address, MAC Address}. The AAA profile for the mobile node maintained by the AAA proxy server 15 can be updated with this information, so that the MAG 26 or LMA 18, if they make an AAA proxy server query, can identify the user profile based on the MAC Address.

At 205, the AAA proxy server 15 sends a message to indicate to the MAG 26 that the mobile node is web-authenticated. For example, the AAA proxy server 15 sends a Remote Authentication Dial In User Service (RADIUS) Change of Authorization (CoA) message that includes the MAC address and mobile node user identity (user name). At 210, the MAG sends a Request/Access Accept message to the AAA server 15, which message includes a calling station identifier corresponding to the mobile node identifier (user name). The web portal 13 and/or AAA proxy server 15 can send a notification that authentication is complete using RADIUS messages, or any other open or proprietary messages. This notification contains the real subscriber identity (e.g., user name or some other identification mapped to the user name) and the IP address used for the HTTP transaction. As a result, the LMA 18 and MAG 26 have the real identity of the mobile node user. The message sent by the AAA proxy server 15 to the MAG 26 informs the MAG 26 of the authentic (real) identity associated with the IP address of the mobile node to be subsequently used in communications by the MAG 26 in policy and charging messages, and to instruct the previously installed Layer-4 redirect rules for the mobile node to be disabled or deleted.

At 220, the MAG 26 may determine to extend the temporary unauthenticated session for the mobile node or terminate it if no CoA is received within the initial lifetime of the temporary unauthenticated session. For example, if there is no CoA within the initial lifetime of the session, then the MAG 26 may delete or disable the temporary unauthenticated session. Otherwise, when a CoA is received (indicating that the mobile node has been web-authenticated), the MAG 26, at 230, sends to the LMA 18 a PBU message indicating that the mobile node has been authenticated and including the real subscriber identity (user name) associated with the user of the mobile node, or another identity tied to the user name, such as an International Mobile Subscriber Identity (IMSI). In the PBU message, the VSE (Vendor Specific Mobility) option is set to "Web Auth" to indicate to the LMA 18 that the mobile node has been web-authenticated, and the real subscriber identity is included in the Web Auth VSE option.

At 240, the LMA performs various operations depending on whether a PBU message is received and whether the PBU message contains a Web Auth VSE option. If no PBU message is received before the initial lifetime expires, the temporary unauthenticated session is deleted. If a PBU message is received, and it does not contain Web Auth VSE option, then the PBU message is rejected and the temporary unauthenticated session is deleted. If a PBU message is received with the Web Auth VSE option, then the LMA accepts the PBU and updates the MN-Id of the session from the real identity contained in the VSE option of the PBU message. Also, the LMA 18 creates a PCRF session with the PCRF server 14 using the real identity of the mobile node contained in the Web Auth VSE option. The LMA sends a PBA message with the allocated session lifetime to the MAG 26.

At 250, the LMA 18 sends a request message to the PCRF 14 for any policy rules associated with the now web-authenticated mobile node. For example, the LMA 18 sends a Credit Control Request (CCR) Initial Request message over the 3GPP Gx interface to the PCRF 14. This message contains various parameters including the MN-Id as the Subscription ID. At 260, the PCRF 14 sends, in response, a message including any policy or credit control rules for the mobile node. For example, the PCRF server 14 responds with a Credit Control Answer (CCA) Install message that includes any policy credit control rules for that subscriber's account.

At 270, the LMA 18, after receiving the CCA Install message, sends a PBA message containing information to indicate that the mobile node is web-authenticated (lifetime=MAX) and at 280, the MAG 135 removes/deletes/terminates the redirect rule for the mobile node and allows all traffic for the mobile node. Thereafter, the mobile node has full IP access as indicated at 290.

FIGS. 7A-7C show the signal flow when the LMA 18 handles the redirection operations. Operations in FIGS. 7A-7C that are the same as those in FIGS. 6A-6C are identified with the same reference numerals. Operations that are slightly different are identified with a primed reference numeral. New or different operations in FIGS. 7A-7C are identified with a new reference numeral. Several operations that occur in the signal flow of FIGS. 6A-6C also occur in the signal flow of FIGS. 7A-7C, albeit in a different order or sequence. Thus, the reference numerals in FIGS. 7A-7C are not in numerical order.

Operations 105-145 are the same as in the signal flow of FIGS. 6A-6C. At 150', the LMA 18 creates a temporary unauthenticated session for the mobile node, assigns an IPv4 address and/or IPv6 prefix to the mobile node, creates a PMIPv6 tunnel with the MAG 26 if it does not already exist, and starts a session with the PCRF server 14.

At 250', the LMA 18 sends a CCR Initial Request message to the PCRF server 14 requesting any policy rules for the mobile node. The CCR Initial Request message also contains the shared identity (used for all unauthenticated user sessions). At 260', the PCRF 14 recognizes the shared identity contained in the CCR Initial Request message and responds to the LMA 18 with a message containing any rules applicable to enabling web authentication only of the mobile node, and also instructing the LMA 18 to install a redirect rule for the mobile node. At 295, the PMIPv6 tunnel between the LMA 18 and the MAG 26 is shown.

At 300, the LMA 18 stores data for installing a redirect rule for the mobile node. This is similar to operation 165 in the signal flow of FIGS. 6A-6C, but is performed at the LMA 18 instead of at the MAG 26. The redirect rule is configured to redirect all traffic (except DNS traffic) during the temporary unauthenticated session for the mobile node to the web portal 13.

Operations 170, 175 and 180 are the same as those described above in connection with FIGS. 6A-6C. At 185', the mobile node sends an HTTP Get request that is directed to the LMA 18. At 190', the LMA 18 determines that the mobile node is not authenticated for web access and sends a redirect message to the mobile node. This is similar to operation 190 described above, except that the LMA 18 is performing it, not the MAG 26. Operation 195 is the same as that described above.

At 195, when the web portal authenticates the user of the mobile node (by way of user credentials entered by the user of the mobile node), then the process proceeds to 200'. At 200', the web portal updates the PCRF server 14 and AAA proxy server 15 with MAC Address to user name mapping via any suitable protocol, such as a SOAP message or Extensible Markup Language (XML). In so doing, the web portal signals the PCRF server 14 and AAA proxy server 15 that the IP address for the mobile node that was previously associated with the shared identity for the temporary unauthenticated session is now authenticated and the signaling to the PCRF server 14 and AAA proxy server 15 includes the mobile node's authenticated real user identity. At 205', the PCRF server 14 responds with a Re-Auth message that updates the PCC rules to allow traffic, and optionally containing the real user identity (e.g., user name or IMSI) of the mobile node that is mapped the user name.

At 290', in response to receiving the message from the PCRF server 14 at 205', the LMA removes/deletes the redirect rule for the mobile node, and allows all traffic from the mobile node. At 305, the LMA sends a Re-Auth Answer message to the PCRF server 14 to confirm receipt of the Re-Auth message from the PCRF 14. Thus, PCRF server 14 signals the LMA 18 to disable or delete the redirect rule.

At 310, the AAA proxy server 15 optionally sends a RADIUS CoA message to the MAG 26. In so doing, AAA proxy server 15 signals the MAG 26 to indicate that the authenticated identity (user name) of the mobile node user (associated with the IP address) can be used by the MAG 26 in the WLAN. At 230, the MAG 26 sends a PBU message to the LMA 18, as described above. At 270, the LMA sends a PBA message back to the MAG 26 as described above. Thereafter, the mobile node has full IP access as indicated at 325.

The foregoing techniques provide an integrated WLAN-EPC web-based authentication solution. These techniques are applicable to support web authentication between the MAG in WLAN access network and the LMA/Packet Data Network Gateway (PGW) in the EPC network, and also in standalone public WLAN access architectures that use PMIPv6 for access aggregation. Again, these techniques involve assigning an IP address from a mobile packet core in the home WWAN of a mobile node without knowing the user identity and the use of redirect rules for a limited/temporary unauthenticated session in order to allow the mobile node to become authenticated using web authentication techniques. In deployments where feasible, the MAG 18 can also exchange the shared identity with a PCRF server 14 similar to how the LMA 26 makes this exchange as described above. Moreover, the web/authentication portal 13 may communicate with the PCRF server 14 regarding the disposition of web authentication, and subsequently, the PCRF server signals the MAG 18 to delete the redirect rule.

In summary, in one form, a method is provided comprising storing data for a redirect rule for traffic associated with a mobile wireless device that has associated with a wireless access point in a public wireless local area network and has been given a temporary unauthenticated session access using an Internet Protocol (IP) address assigned to the mobile wireless device by equipment in a wireless wide area core network that serves as a home network for the mobile wireless device, the redirect rule for use when a request is received from the mobile wireless device for world wide web access in order to obtain authentication for the mobile wireless device before permitting world wide web access; receiving a world wide web access request from the mobile wireless device; and redirecting the world wide web access request to an authentication portal to allow a user of the mobile wireless device to enter user credentials to allow for world wide web access using the IP address. The storing of the data for the redirect rule may be performed when an access accept message received from an authentication server indicates that the mobile wireless device is unknown.

Similarly, an apparatus is provided comprising one or more network ports to receive messages from or transmit to over a network; a packet forwarding unit configured to process and forward messages over the network; a memory; and a processor coupled to the memory and to the packet forwarding unit, wherein the apparatus is configured to: store data for a redirect rule for traffic associated with a mobile wireless device that has associated with a wireless access point in a public wireless local area network and has been given a temporary unauthenticated session access using an Internet Protocol (IP) address assigned to the mobile wireless device by equipment in a wireless wide area core network that serves as a home network for the mobile wireless device, the redirect rule for use when a request is received from the mobile wireless device for world wide web access in order to obtain authentication for the mobile wireless device before permitting world wide web access; receive a world wide web access request from the mobile wireless device; and redirect the world wide web access request to an authentication portal to allow a user of the mobile wireless device to enter user credentials to allow for world wide web access using the IP address.

In still another form, provide herein is one or more computer readable storage media encoded with software comprising computer executable instructions operable to: store data for a redirect rule for traffic associated with a mobile wireless device that has associated with a wireless access point in a public wireless local area network and has been given a temporary unauthenticated session access using an Internet Protocol (IP) address assigned to the mobile wireless device by equipment in a wireless wide area core network that serves as a home network for the mobile wireless device, the redirect rule for use when a request is received from the mobile wireless device for world wide web access in order to obtain authentication for the mobile wireless device before permitting world wide web access; receive a world wide web access request from the mobile wireless device; and redirect the world wide web access request to an authentication portal to allow a user of the mobile wireless device to enter user credentials to allow for world wide web access using the IP address.

The above description is intended by way of example only.

What is claimed is:

1. A method comprising:
   at a local mobility anchor (LMA) router in a wireless wide area core network that serves a home network for a mobile wireless device that has associated with a wireless access point wirelessly connected with a gateway device through an access point in a public wireless local area network:
   creating a temporary unauthenticated session for the mobile wireless device;
   creating an Internet Protocol (IP) tunnel with the gateway device for traffic associated with the mobile wireless device and assigning an IP address for the mobile wireless device;
   sending a request to a policy server for policy rules for the mobile wireless device, the request including a shared identity associated with the IP address for the mobile wireless device that indicates the temporary unauthenticated session;
   receiving from the policy server the policy and an instruction to install a redirect rule for the mobile wireless device that will be active during the temporary unauthenticated session, wherein the redirect rule is configured to redirect all requests, except for Domain Name System (DNS) requests, received from the mobile wireless device for world wide access during the temporary unauthenticated session to an authentication portal to be used to obtain authentication for the mobile wireless device before permitting the world wide web access;
   installing the redirect rule responsive to the received instruction to install the redirect rule;
   receiving a world wide web access request from the mobile wireless device;
   redirecting the world wide web access request to the authentication portal in accordance with the redirect rule to allow a user of the mobile wireless device to enter user credentials for world wide web access using the IP address; and
   deleting the redirect rule for the mobile wireless device when a message is received from the policy server indicating that the mobile wireless device has been authenticated by the authentication portal;
   wherein the shared identity is included in a default profile and comprises a sequence of bits that otherwise are invalid but are used by and known to equipment in the wireless local area network and wireless wide area network as being allocated for use in temporary unauthenticated sessions for mobile wireless devices, and further comprising creating the temporary unauthenticated session using the shared identity.

2. The method of claim 1, and further comprising creating a proxy mobile IP tunnel with the gateway device in the public wireless local area network and using the proxy mobile IPv6 protocol to assign the IP address for the mobile wireless client device at the LMA router in the wireless wide area core network.

3. The method of claim 1, and further comprising creating a General Packet Radio Service Tunnel with the gateway device in the public wireless local area network and using the General Packet Radio Service Tunneling protocol to assign the IP address for the mobile wireless device.

4. The method of claim 1, and further comprising:
   sending a message from the authentication portal to an authentication, accounting and authorization (AAA) server indicating that the IP address associated with the shared identity has since been authenticated, together with an authentic identity to be used in the public wireless local area network; and sending from the AAA server to the LMA a message containing the authentic identity associated with the IP address to be subsequently used in communications of policy and charging messages, and indicating that the redirect rule should be disabled.

5. The method of claim 1, and further comprising receiving an attach trigger message sent by the mobile wireless device, the attach trigger message containing a service set identifier that identifies the home network for the mobile wireless device in the wireless wide area network.

6. The method of claim 1, and further comprising:
sending an access request message to the policy server, the access request message including the media access control (MAC) address of the mobile wireless device;
receiving from the policy server an access accept message indicating that the mobile wireless device is unknown and to use a default profile for the mobile wireless device, wherein the default profile includes the shared identity to be used for the temporary unauthenticated session for the mobile wireless device; and
wherein storing is performed based on the access accept message indicating that the mobile wireless device is unknown.

7. The method of claim 6, wherein the shared identity included in the default profile comprises a sequence of bits that otherwise are invalid but are used by and known to equipment in the wireless local area network and wireless wide area network as being allocated for use in temporary unauthenticated sessions for mobile wireless devices, and further comprising creating the temporary unauthenticated session using the shared identity.

8. An apparatus comprising:
one or more network ports to receive messages from or transmit to over a network;
a packet forwarding unit configured to process and forward messages over the network;
a memory; an
a processor coupled to the memory and to the packet forwarding unit, such that the apparatus is configured to:
at a local mobility anchor (LMA) router in a wireless wide area core network that serves a home network for a mobile wireless device that has associated with a wireless access point wirelessly connected with a gateway device through an access point in a public wireless local area network:
create a temporary unauthenticated session for the mobile wireless device; create an Internet Protocol (IP) tunnel with the gateway device for traffic associated with the mobile wireless device and assigning an IP address for the mobile wireless device;
send a request to a policy server for policy rules for the mobile wireless device, the request including a shared identity associated with the IP address for the mobile wireless device that indicates the temporary unauthenticated session;
receive from the policy server the policy and an instruction to install a redirect rule for the mobile wireless device that will be active during the temporary unauthenticated session, wherein the redirect rule is configured to redirect all requests, except for Domain Name System (DNS) requests, received from the mobile wireless device for world wide access during the temporary unauthenticated session to an authentication portal to be used to obtain authentication for the mobile wireless device before permitting the world wide web access;
install the redirect rule responsive to the received instruction to install the redirect rule;
receive a world wide web access request from the mobile wireless device;
redirect the world wide web access request to the authentication portal in accordance with the redirect rule to allow a user of the mobile wireless device to enter user credentials for world wide web access using the IP address; and
delete the redirect rule for the mobile wireless device when a message is received from the policy server indicating that the mobile wireless device has been authenticated by the authentication portal;
wherein the shared identity included in the default profile comprises a sequence of bits that otherwise are invalid but are used by and known to equipment in the wireless local area network and wireless wide area network as being allocated for use in temporary unauthenticated sessions for mobile wireless devices, and wherein the apparatus is further configured to create the temporary unauthenticated session using the shared identity.

9. The apparatus of claim 8, further comprising an authentication portal and the authentication, accounting and authorization (AAA) server, wherein the authentication portal is configured to send a message to the AAA server indicating that the IP address associated with the shared identity has since been authenticated, together with an authentic identity to be used in the public wireless local area network, and the AAA server is configured to send to the LMA a message containing the authentic identity associated with the IP address to be subsequently used in communications of policy and charging messages.

10. The apparatus of claim 8, wherein the apparatus is further configured to receive an attach trigger message sent by the mobile wireless device, the attach trigger message containing a service set identifier that identifies the home network for the mobile wireless device in the wireless wide area network.

11. One or more non-transitory computer readable storage media encoded with software comprising computer executable instructions operable to:
at a local mobility anchor (LMA) router in a wireless wide area core network that serves a home network for a mobile wireless device that has associated with a wireless access point wirelessly connected with a gateway device through an access point in a public wireless local area network:
create a temporary unauthenticated session for the mobile wireless device;
create an Internet Protocol (IP) tunnel with the gateway device for traffic associated with the mobile wireless device and assigning an IP address for the mobile wireless device;
send a request to a policy server for policy rules for the mobile wireless device, the request including a shared identity associated with the IP address for the mobile wireless device that indicates the temporary unauthenticated session;
receive from the policy server the policy and an instruction to install a redirect rule for the mobile wireless device that will be active during the temporary unauthenticated session, wherein the redirect rule is configured to redirect all requests, except for Domain Name System (DNS) requests, received from the mobile wireless device for world wide access during the temporary unauthenticated session to an authentication portal to be used to obtain authentication for the mobile wireless device before permitting the world wide web access;

install the redirect rule responsive to the received instruction to install the redirect rule;

receive a world wide web access request from the mobile wireless device;

redirect the world wide web access request to the authentication portal in accordance with the redirect rule to allow a user of the mobile wireless device to enter user credentials for world wide web access using the IP address; and delete the redirect rule for the mobile wireless device when a message is received from the policy server indicating that the mobile wireless device has been authenticated by the authentication portal;

wherein the shared identity is included in a default profile and comprises a sequence of bits that otherwise are invalid but are used by and known to equipment in the wireless local area network and wireless wide area network as being allocated for use in temporary unauthenticated sessions for mobile wireless devices, and further comprising instructions operable to create the temporary unauthenticated session using the shared identity.

* * * * *